(12) United States Patent
Ong et al.

(10) Patent No.: US 8,909,889 B1
(45) Date of Patent: Dec. 9, 2014

(54) METHOD AND APPARATUS FOR SERVICING HOST COMMANDS BY A DISK DRIVE

(75) Inventors: Choo-Bhin Ong, Foothill Ranch, CA (US); Chandra M. Guda, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 459 days.

(21) Appl. No.: 13/270,130

(22) Filed: Oct. 10, 2011

(51) Int. Cl.
*G06F 13/00* (2006.01)
*G06F 3/06* (2006.01)
*G06F 13/16* (2006.01)

(52) U.S. Cl.
CPC .......... *G06F 3/0601* (2013.01); *G06F 13/1668* (2013.01); *G06F 3/0688* (2013.01); *G06F 13/1657* (2013.01)
USPC ............. 711/168; 711/103; 711/170; 710/21; 710/104; 713/2; 360/73.01; 365/189.04; 365/189.2; 365/233.14; 369/53.45; 369/178.01

(58) Field of Classification Search
CPC ... G06F 3/0601; G06F 3/0629; G06F 3/0685; G06F 3/0688; G06F 12/0638; G06F 13/1657; G06F 13/1668
USPC ......... 711/103, 168, 170; 710/21, 104; 713/2; 365/189.04, 189.2, 233.14; 360/73.01; 369/53.45, 178.01
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,018,789 A | 1/2000 | Sokolov et al. | |
| 6,044,439 A | 3/2000 | Ballard et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Reba I Elmore

(57) ABSTRACT

A disk drive including a disk configured to spin at a target spin speed, a servo core configured to access the disk, a first non-volatile memory configured to store a first initialization firmware, a second non-volatile memory configured to store a second initialization firmware, a first volatile memory, a second volatile memory, a non-volatile memory core configured to access the first non-volatile memory, and a main core. The main core is configured to load the second initialization firmware from the second non-volatile memory to the second volatile memory concurrently with the loading of the first initialization firmware from the first non-volatile memory to the first volatile memory by the non-volatile memory core, control the servo core to initiate spinning of the disk, and communicate with the non-volatile memory core to service host commands from the first non-volatile memory when the disk is not spinning at the target spin speed.

24 Claims, 4 Drawing Sheets

(56) References Cited

U.S. PATENT DOCUMENTS

| | | |
|---|---|---|
| 6,115,200 A | 9/2000 | Allen et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,275,949 B1 | 8/2001 | Watanabe |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,990 B2 | 8/2002 | Serrano et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,662,267 B2 | 12/2003 | Stewart |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,754,021 B2 | 6/2004 | Kisaka et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,767 B2 | 8/2004 | Coulson |
| 6,791,779 B1 | 9/2004 | Singh et al. |
| 6,792,486 B1 | 9/2004 | Hanan et al. |
| 6,799,274 B1 | 9/2004 | Hamlin |
| 6,807,630 B2 | 10/2004 | Lay et al. |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,909,574 B2 | 6/2005 | Aikawa et al. |
| 6,910,099 B1 | 6/2005 | Wang et al. |
| 6,920,533 B2 | 7/2005 | Coulson et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |

(56) References Cited

U.S. PATENT DOCUMENTS

| | | |
|---|---|---|
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,017,037 B2 | 3/2006 | Fortin et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,107,444 B2 | 9/2006 | Fortin et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,142,385 B2 | 11/2006 | Shimotono et al. |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,334,082 B2 | 2/2008 | Grover et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,395,452 B2 | 7/2008 | Nicholson et al. |
| 7,404,013 B1 | 7/2008 | Masiewicz |
| 7,406,545 B1 | 7/2008 | Rothberg et al. |
| 7,411,757 B2 | 8/2008 | Chu et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,454,653 B2 | 11/2008 | Nicholson et al. |
| 7,461,202 B2 | 12/2008 | Forrer, Jr. et al. |
| 7,469,336 B2 | 12/2008 | Choo |
| 7,471,483 B1 | 12/2008 | Ferris et al. |
| 7,471,486 B1 | 12/2008 | Coker et al. |
| 7,472,222 B2 | 12/2008 | Auerbach et al. |
| 7,477,477 B2 | 1/2009 | Maruchi et al. |
| 7,486,060 B1 | 2/2009 | Bennett |
| 7,496,493 B1 | 2/2009 | Stevens |
| 7,509,471 B2 | 3/2009 | Gorobets |
| 7,516,346 B2 | 4/2009 | Pinheiro et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,610,438 B2 | 10/2009 | Lee et al. |
| 7,613,876 B2 | 11/2009 | Bruce et al. |
| 7,619,841 B1 | 11/2009 | Kupferman |
| 7,620,784 B2 | 11/2009 | Panabaker |
| 7,644,231 B2 | 1/2010 | Recio et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,360 B1 | 3/2010 | Brunnett et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,752,491 B1 | 7/2010 | Liikanen et al. |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |

(56) References Cited

U.S. PATENT DOCUMENTS

| | | |
|---|---|---|
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 2002/0156970 A1 | 10/2002 | Stewart |
| 2003/0142336 A1* | 7/2003 | Brandl .................. 358/1.13 |
| 2004/0210848 A1 | 10/2004 | Vineyard, Jr. et al. |
| 2005/0251617 A1 | 11/2005 | Sinclair et al. |
| 2006/0184653 A1* | 8/2006 | van Riel .................. 709/222 |
| 2006/0195657 A1 | 8/2006 | Tien et al. |
| 2006/0248387 A1 | 11/2006 | Nicholson et al. |
| 2006/0294357 A1 | 12/2006 | Choo |
| 2007/0186039 A1 | 8/2007 | Nam |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0177974 A1* | 7/2008 | Chiang et al. .................. 711/173 |
| 2008/0222353 A1 | 9/2008 | Nam et al. |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0087168 A1 | 4/2009 | Park et al. |

(56) References Cited

U.S. PATENT DOCUMENTS

| | | |
|---|---|---|
| 2009/0103203 A1 | 4/2009 | Yoshida |
| 2009/0106518 A1 | 4/2009 | Dow |
| 2009/0113702 A1 | 5/2009 | Hogg |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | McKean et al. |
| 2010/0088459 A1 | 4/2010 | Arya et al. |
| 2010/0195463 A1 | 8/2010 | Kurashige et al. |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Xiaojian Wu, A. L. Narasimha Reddy, "Managing Storage Space in a Flash and Disk Hybrid Storage System", http://www.ee.tamu.edu/~reddy/papers/mascots09.pdf, downloaded dated Jun. 12, 2010, 4 pages.

Xiaojian Wu, A. L. Narasimha Reddy, "Managing Storage Space in a Flash and Disk Hybrid Storage System", D http://www.ee.tamu.edu/~reddy/papers/mascots09.pdf, downloaded dated Jun. 12, 2010, from Modeling, Analysis & Simulation of Computer and Telecommunication Systems, 2009. Mascots '09. IEEE International Symposium, p. 1-4, Sep. 21-23, 2009.

Virgil V. Wilkins, U.S. Appl. No. 12/912,662, filed Oct. 26, 2010, 19 pages.

\* cited by examiner

METHOD AND APPARATUS FOR SERVICING HOST COMMANDS BY A DISK DRIVE

BACKGROUND

A disk drive is commonly used to store data in computers, databases, digital video recorders, and other devices. The disk drive may write data to and read data from a disk in response to write/read commands from a host that uses the disk for data storage. However, to access the disk, the disk generally needs to be spinning at a certain speed. When the disk drive is initially powered up, this entails starting to spin the disk from a state of rest to the desired speed.

Thus, before the disk drive is able to service host commands, the disk drive waits until the disk goes from a state of rest to spinning at the desired speed. This in turn delays a time at which a user can use the disk drive and any device which includes the disk drive.

BRIEF DESCRIPTION OF THE DRAWINGS

The features and advantages of the present embodiments of the present invention will become more apparent from the detailed description set forth below when taken in conjunction with the drawings, wherein.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
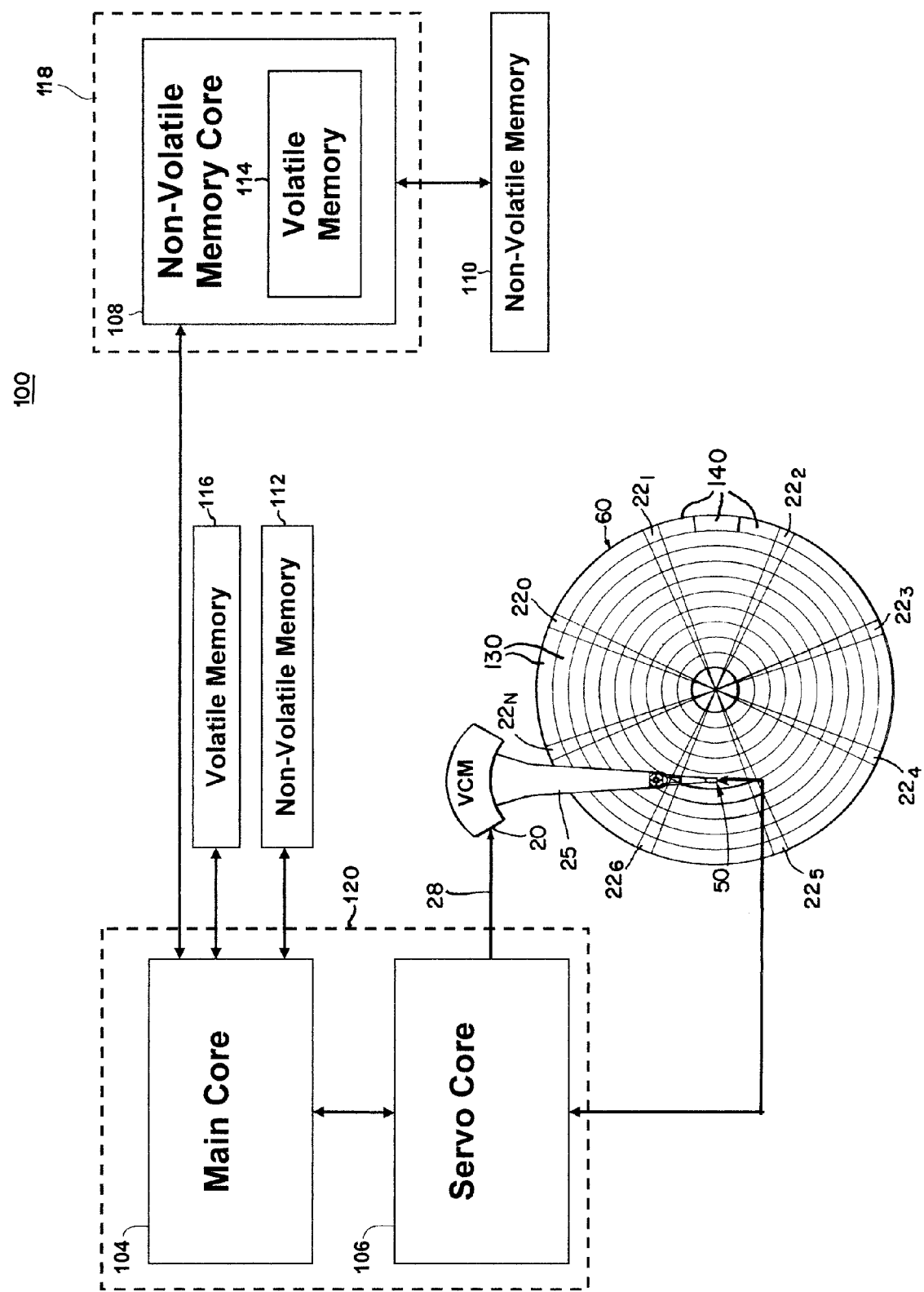
FIG. 1 depicts a disk drive including a main core, a servo core, and a non-volatile memory core according to an embodiment of the present invention.

In an embodiment, as seen in FIG. 1, a disk drive 100 includes a disk 60, a head 50 connected to a distal end of an actuator arm 25, a main core 104, a servo core 106, a non-volatile memory core 108, a first non-volatile memory 110, a second non-volatile memory 112, a first volatile memory 114, a second non-volatile memory 116, a non-volatile memory controller 118, and a disk controller 120.

In an embodiment, the main core 104 and the servo core 106 are part of the disk controller 120, while the non-volatile memory core 108 is part of the non-volatile memory controller 118. As seen in FIG. 1, the disk controller 120 and the non-volatile memory controller 118 are separate from each other. In an embodiment, the disk controller 120 and the non-volatile memory controller 118 are virtually separate from each other. In another embodiment, the disk controller 120 and the non-volatile memory controller 118 are located on separate system on chips ("SOC").

The actuator arm 25 is rotated about a pivot by a voice coil motor (VCM) 20 to position the head 50 radially over the disk 60. The disk drive 100 also includes a spindle motor (not shown) for rotating the disk during read/write operations.

The disk 60 comprises a number of radially spaced, concentric tracks 130. Each track 130 may be divided into a number of sectors 140 that are spaced circumferentially along the track 130. The sectors may be used to store user data and other information. In an embodiment, the disk 60 can store a first data for servicing host commands. The disk 60 may also comprise a plurality of angularly spaced servo wedges $22_0$-$22_N$, each of which may include embedded servo information that can be read from the disk 60 by the head 50 to determine the position of the head 50 over the disk 60.

For example, each servo wedge $22_0$-$22_N$ may include a pattern of alternating magnetic transitions (servo burst), which may be read from the disk 60 by the head 50 and processed by the controller 120 to estimate the position of the head 50 relative to the disk 60. The angular spacing between the servo wedges $22_0$-$22_N$ may be uniform, as shown in the example in FIG. 1.

In an embodiment, the servo core 106 is configured to initiate spinning of the disk 60. Furthermore, the servo core 106 can be configured to access data stored on the disk 60 and can be controlled, for example, by the main core 104. Data on the disk 60 can be accessed, for example, when the disk 60 spins at a target spin speed. The target spin speed can be a speed which the disk spins at where data can be safely and reliably accessed from the disk 60.

In an embodiment, the first non-volatile memory 110 stores a first initialization firmware, while the second non-volatile memory 112 stores a second initialization firmware. In an embodiment, the first non-volatile memory 110 also stores second data for servicing host commands. In one embodiment, the second data for servicing host commands is identical to the first data for servicing host commands. In another embodiment, the second data for servicing host commands is a portion of the first data for servicing host commands.

In an embodiment, the first non-volatile memory 110 is a NAND memory, such as a NAND flash memory. Furthermore, in an embodiment, the second non-volatile memory 112 is a serial flash memory or a NAND memory, such as a NAND flash memory. In an embodiment, the first non-volatile memory and the second non-volatile memory are part of a same memory. In an embodiment, the non-volatile memory core 108 accesses the first volatile memory 114, the first non-volatile memory 110, and the main core 104, while the main core 104 accesses the second volatile memory 116, the second non-volatile memory 112, the servo core 106, and the non-volatile memory core 108.

For example, upon power up, the non-volatile memory core 108 can load the first initialization firmware from the first non-volatile memory 110 to the first volatile memory 114. Similarly, upon power up, the main core 104 can load the second initialization firmware from the second non-volatile memory 112 to the second volatile memory 116 concurrently with the loading of the first initialization firmware from the first non-volatile memory 110 to the first volatile memory 114 by the non-volatile memory core 108.

In an embodiment, the first volatile memory 114 is located in the non-volatile memory core 108. In another embodiment, the first volatile memory 114 is located outside the non-volatile memory core 108 and is coupled to the non-volatile memory core 108. In an embodiment, the second volatile memory 116 is a double data rate ("DDR") memory.

After the first initialization firmware has been loaded, the main core 104 can communicate with the non-volatile memory core 108 to enable the non-volatile memory core to service host commands from a host. In an embodiment, the main core 104 communicates with the non-volatile memory core 108 to service host commands from the host prior to the disk 60 spinning at the target spin speed. However, after the disk 60 is spinning at the target spin speed, the main core 104 can service host commands from the host using the disk 60 or the first non-volatile memory 110. In an embodiment, the main core 104 accesses the disk 60 using the servo core 106, while the main core 104 accesses the non-volatile memory 110 using the non-volatile memory core 108.

Figure 2:
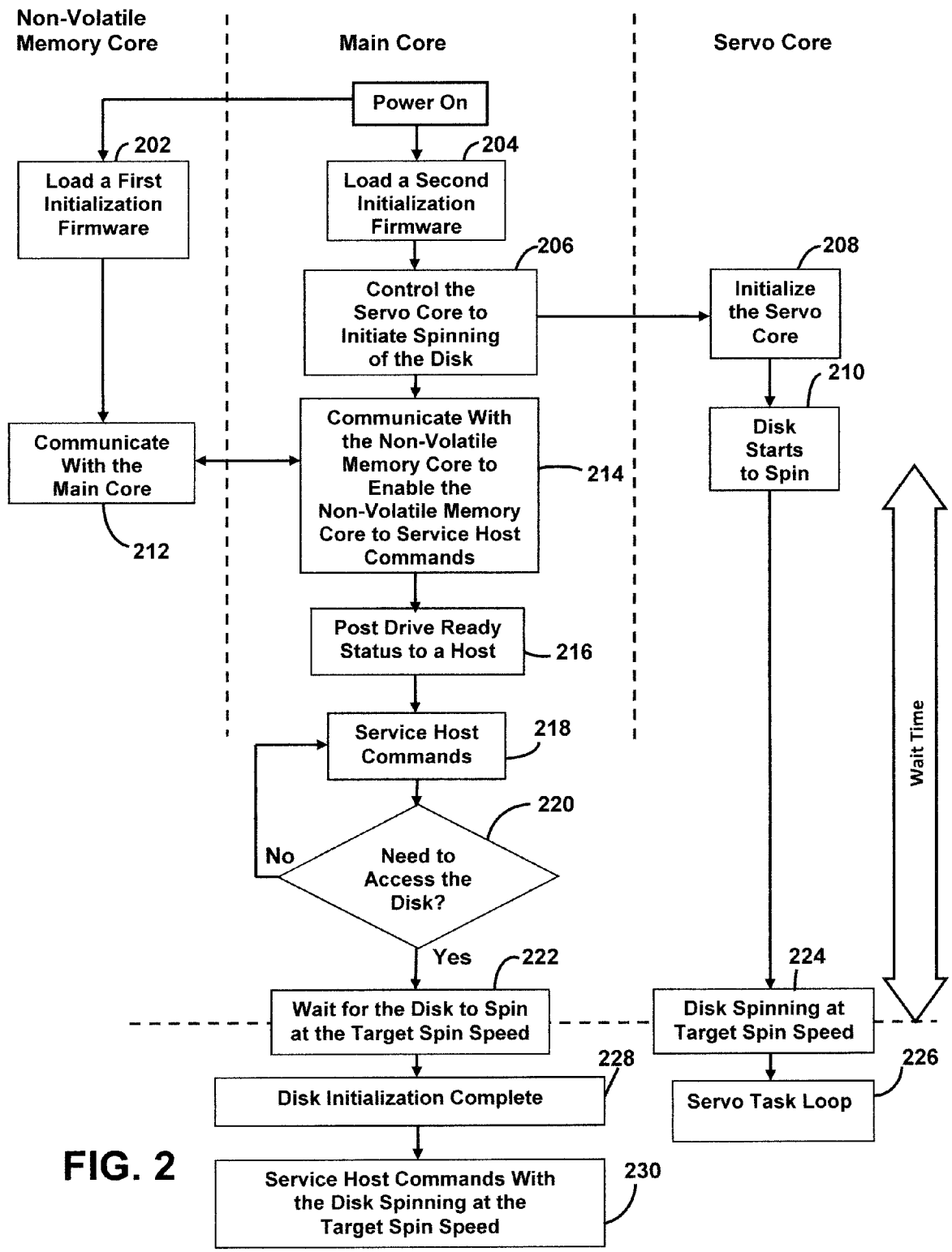
FIG. 2 depicts a process according to an embodiment of the present invention.

FIG. 2 depicts a process according to an embodiment of the present invention. FIG. 2 depicts, for example, a timeline of the process. In Step 202, the first initialization firmware is loaded. For example, the non-volatile memory core 108 can load the first initialization firmware from the non-volatile memory 110 to the first volatile memory 114. In Step 204, the second initialization firmware is loaded. For example, the main core 104 can load the second initialization firmware from the second non-volatile memory 112 to the second volatile memory 116. In an embodiment, Steps 202 and 204 are performed concurrently. That is, the main core 104 can load the second initialization firmware from the second non-volatile memory 112 to the second volatile memory 116 concurrently with the loading of the first initialization firmware from the first non-volatile memory 110 to the first volatile memory 114 by the non-volatile memory core 108.

In Step 206, the servo core 106 is controlled to initiate spinning of the disk 60. For example, the main core 104 can control the servo core 106 to initiate spinning of the disk 60. In Step 208, the servo core is initialized. For example, upon receiving the command from the main core 104 to initiate spinning of the disk 60, the servo core 106 can be initialized. In Step 210, the disk 60 starts to spin. For example, after initializing of the servo core 106, the servo core 106 can initiate spinning of the disk 60.

In Step 212 the non-volatile memory core 108 communicates with the main core, while in Step 214 the main core 104 communicates with the non-volatile memory core 108 to enable the non-volatile memory core 108 to service host commands. For example, the non-volatile memory core 108 and the main core 104 can communicate with each other in preparation for servicing host commands using the first non-volatile memory 110 when the disk 60 is not spinning at the target spin speed.

In Step 216, the main core 104 posts a drive ready status to a host. For example, the main core 104 can post a HDD ready signal such as 0x5001 to a host. In Step 218 the main core 104 services host commands. For example, the main core 104 services the host commands using the first non-volatile memory 110 when the disk 60 is not spinning at the target spin speed. In an embodiment, the main core 104 services the host commands using the second data for servicing host commands stored in the first non-volatile memory 110.

In Step 220, the main core 104 determines whether there is a need to access the disk 60. For example, the main core 104 may need to access the disk 60 when the first data for servicing host commands stored on the disk 60 is required to service the host commands instead of the second data for servicing host commands stored in the first non-volatile memory 110. If there is no need to access the disk 60, the process repeats Step 218 until there is the need to access the disk 60.

When there is a need to access the disk 60, the process proceeds to Step 222. In Step 222, the main core 104 waits for the disk 60 to spin at a target spin speed. In Step 224 the disk 60 is spinning at a target spin speed. In Step 226, the servo task loop begins. For example, the servo core 106 implements the servo task loop.

In Step 228, the disk initialization is complete. In Step 230, the main core 104 services host commands with the disk 60 spinning at the target spin speed. For example, the main core 104 can service host commands using both the disk 60 and the first non-volatile memory 110. In an embodiment, the main core 104 services host commands using just the disk 60.

Figure 3:
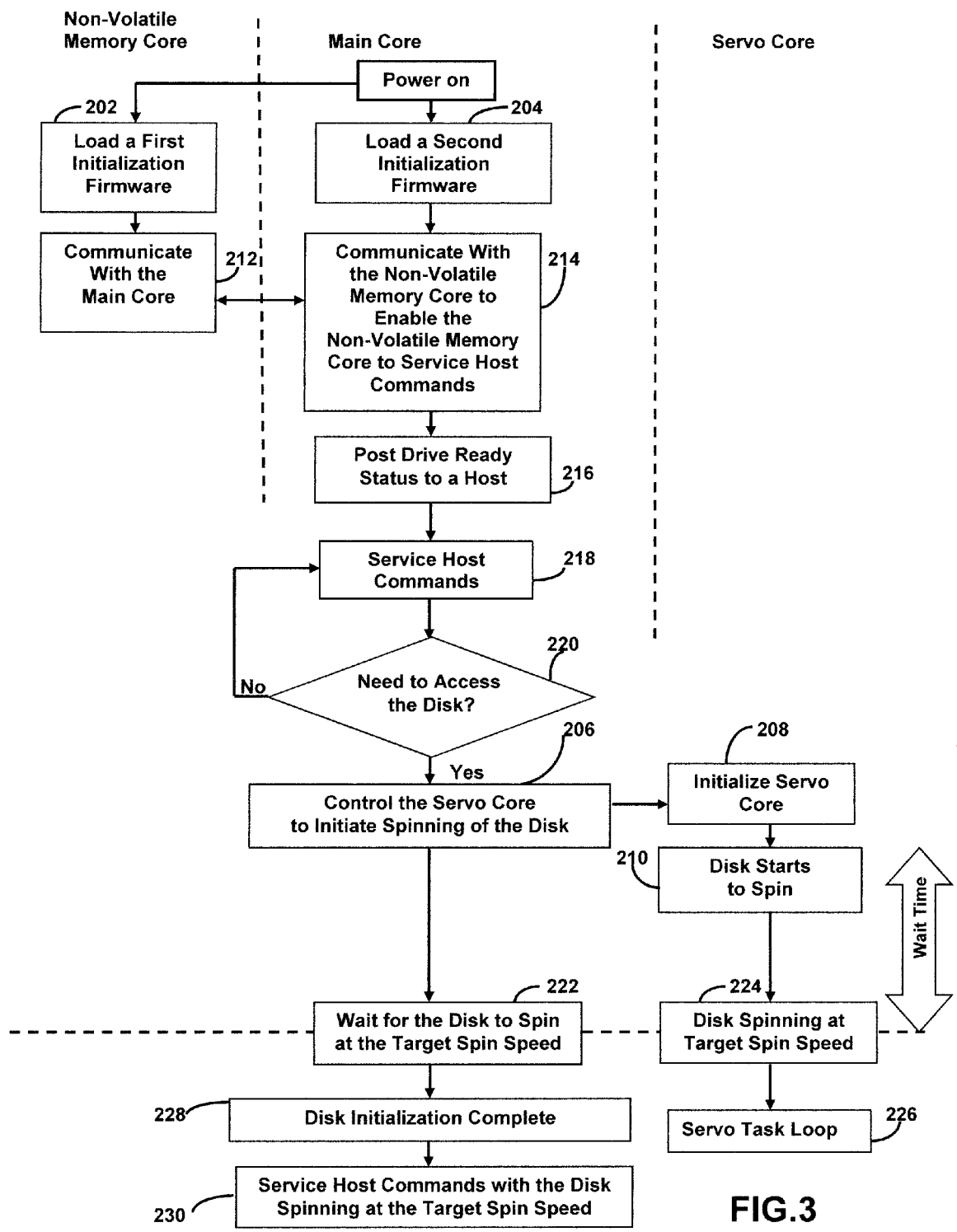
FIG. 3 depicts a process according to an embodiment of the present invention.

FIG. 3 depicts a process according to an embodiment of the present invention. The process in FIG. 3 is similar to the process in FIG. 2, except that the main core 104 waits to control the servo core 106 to initiate spinning of the disk 60 until the main core 104 receives a host command which cannot be serviced using the first non-volatile memory 110, but instead needs to be serviced using the disk 60. Thus, Step 206 is located below Step 220. Since the remaining steps in FIG. 3 are substantially similar to the steps in FIG. 2, a description of the remaining steps will not be repeated.

Figure 4:
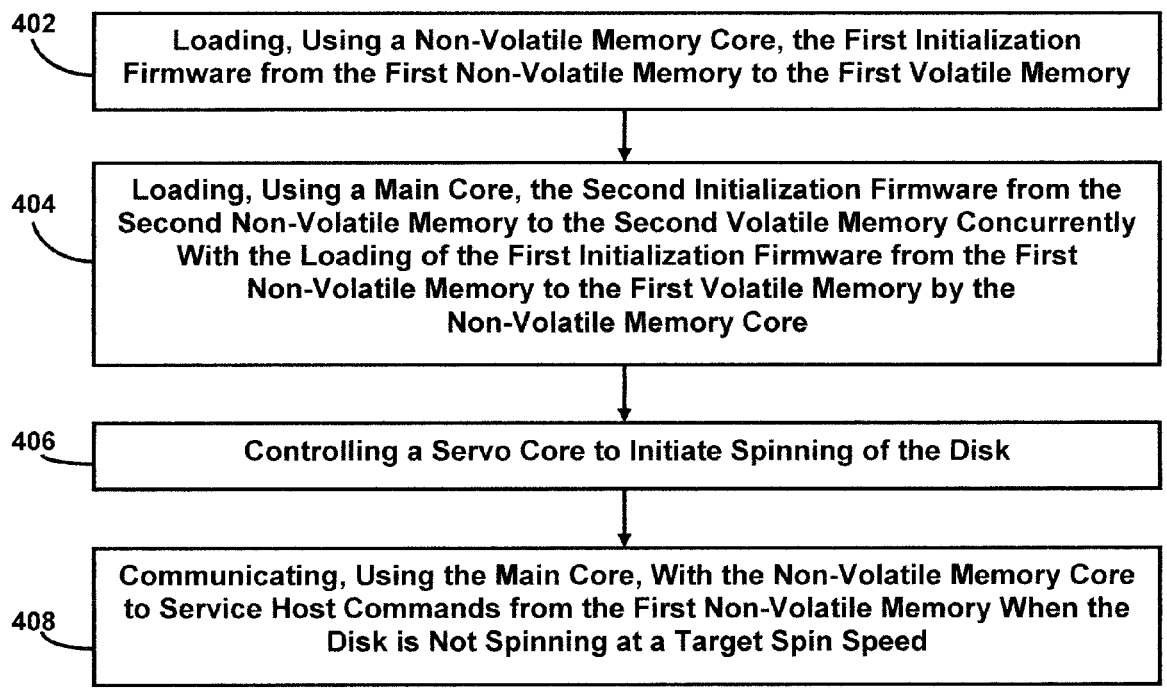
FIG. 4 depicts a process according to an embodiment of the present invention.

FIG. 4 depicts a process according to an embodiment of the present invention. In Step 402, the first initialization firmware is loaded from the first non-volatile memory 112 to the first volatile memory 114 using a non-volatile memory core 108.

In Step 404, the second initialization firmware is loaded using the main core 104 from the second non-volatile memory 112 to the second volatile memory 116 concurrently with the loading of the first initialization firmware from the first non-volatile memory 110 to the first volatile memory 114 by the non-volatile memory core 108.

In Step 406, the servo core 106 is controlled to initiate spinning of the disk 60. For example, the main core 104 can control the servo core 106 to initiate spinning of the disk 60. In Step 408, the main core 104 communicates with the non-volatile memory core 108 to enable the non-volatile memory core to service host commands from the first non-volatile memory 110 when the disk 60 is not spinning at a target spin speed. For example, the main core 104 can communicate with the non-volatile memory core 108 to enable the non-volatile memory core 108 to service host commands from the first non-volatile memory 110 when the disk 60 is not spinning at a target spin speed.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. Certain steps may be omitted, divided into additional steps, and/or combined into fewer steps. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A disk drive comprising:
   a disk configured to spin at a target spin speed and store first data for servicing host commands;
   a servo core configured to access the disk and initiate spinning of the disk;
   a first non-volatile memory configured to store a first initialization firmware and second data for servicing host commands;
   a second non-volatile memory configured to store a second initialization firmware;
   a first volatile memory;
   a second volatile memory;
   a non-volatile memory core configured to access the first non-volatile memory and load the first initialization firmware from the first non-volatile memory to the first volatile memory; and
   a main core configured to:
      load the second initialization firmware from the second non-volatile memory to the second volatile memory concurrently with the loading of the first initialization firmware from the first non-volatile memory to the first volatile memory by the non-volatile memory core;
      control the servo core to initiate spinning of the disk; and
      communicate with the non-volatile memory core to service host commands from the first non-volatile memory when the disk is not spinning at the target spin speed.

2. The disk drive of claim 1 wherein the main core is further configured to post a drive ready status to a host after the main core communicates with the non-volatile memory core.

3. The disk drive of claim 2 wherein the main core is further configured to control the servo core to initiate spinning of the disk prior to posting the drive ready status.

4. The disk drive of claim 1 wherein the main core is further configured to post a drive ready status prior to the disk spinning at the target spin speed.

5. The disk drive of claim 1 wherein the main core is further configured to control the servo core to initiate spinning of the disk when a host command from the host requires data stored on the disk.

6. The disk drive of claim 1 wherein the first non-volatile memory comprises a NAND memory.

7. The disk drive of claim 1 wherein the second non-volatile memory comprises a serial flash memory or a NAND memory.

8. The disk drive of claim 1 wherein the second volatile memory comprises a double data rate (DDR) memory.

9. The disk drive of claim 1 wherein the first volatile memory is located in the non-volatile memory core.

10. The disk drive of claim 1 wherein the servo core and the main core are part of a disk controller, and the non-volatile memory core is part of a non-volatile memory controller.

11. The disk drive of claim 10 wherein the disk controller and the non-volatile memory controller are separate from each other.

12. The disk drive of claim 1 wherein the first non-volatile memory and the second non-volatile memory are part of a same memory.

13. A method of operating a disk drive to service host commands from a host, the disk drive comprising a disk configured to spin at a target spin speed and store first data for servicing host commands, a servo core configured to access the disk and initiate spinning of the disk, a first non-volatile memory configured to store a first initialization firmware and second data for servicing host commands, a second non-volatile memory configured to store a second initialization firmware, a first volatile memory, a second volatile memory, a non-volatile memory core, and a main core, the method comprising the steps of:
   loading, using the non-volatile memory core, the first initialization firmware from the first non-volatile memory to the first volatile memory;
   loading, using the main core, the second initialization firmware from the second non-volatile memory to the second volatile memory concurrently with the loading of the first initialization firmware from the first non-volatile memory to the first volatile memory by the non-volatile memory core;
   controlling the servo core to initiate spinning of the disk; and
   communicating, using the main core, with the non-volatile memory core to service host commands from the first non-volatile memory when the disk is not spinning at the target spin speed.

14. The method of claim 13 further comprising posting a drive ready status to a host after the main core communicates with the non-volatile memory core.

15. The method of claim 14 further comprising controlling the servo core to initiate spinning of the disk prior to posting the drive ready status.

16. The method of claim 13 further comprising posting the drive ready status prior to the disk spinning at the target spin speed.

17. The method of claim 13 further comprising controlling the servo core to initiate spinning of the disk when a host command from the host requires data stored on the disk.

18. The method of claim 13 wherein the first non-volatile memory comprises a NAND memory.

19. The method of claim 13 wherein the second non-volatile memory comprises a serial flash memory or a NAND memory.

20. The method of claim 13 wherein the second volatile memory comprises a double data rate (DDR) memory.

21. The method of claim 13 wherein the first volatile memory is located in the non-volatile memory core.

22. The method of claim 13 wherein the servo core and the main core are part of a disk controller, and the non-volatile memory core is part of a non-volatile memory controller.

23. The method of claim 22 wherein the disk controller and the non-volatile memory controller are separate from each other.

24. The method of claim 13 wherein the first non-volatile memory and the second non-volatile memory are part of a same memory.

* * * * *